United States Patent [19]
Levinson

[11] Patent Number: 5,094,865
[45] Date of Patent: Mar. 10, 1992

[54] TWO STAGE PROCESS FOR COOKING/BROWING/CRUSTING FOOD BY MICROWAVE ENERGY AND INFRARED ENERGY

[76] Inventor: Melvin L. Levinson, 8 Stratford Cir., Edison, N.J. 08820-1830

[21] Appl. No.: 659,340

[22] PCT Filed: Feb. 18, 1991

[86] PCT No.: PCT/US91/01042
§ 371 Date: Apr. 15, 1991
§ 102(e) Date: Apr. 15, 1991

[51] Int. Cl.$^5$ .............................. A23L 1/00; H05B 6/00
[52] U.S. Cl. ................... 426/243; 219/10.55 E; 219/10.55 M; 426/107; 426/234
[58] Field of Search ............... 426/107, 113, 234, 243; 219/10.55 E, 10.55 M

[56] References Cited

U.S. PATENT DOCUMENTS 4,486,640 12/1984 Bowen et al. ................... 426/243
4,917,907 4/1990 Kwis et al. ....................... 426/243

FOREIGN PATENT DOCUMENTS 2196231A 4/1988 United Kingdom ............... 426/243

Primary Examiner—George Yeung
Attorney, Agent, or Firm—Harry B. Keck

[57] ABSTRACT

A two-stage process for baking/crusting food products is proposed. The First Stage is carried out in a microwave oven chamber; the Second Stage is carried out beneath a gas or electric broiler. In both stages, the food is placed on a browning/crusting device which provides a metal cooking surface, heated by adherent microwave lossy materials or on a smooth surface of one or more blocks of microwave lossy ceramic or microwave lossy igneous rock which is supported in a metal tray. In the First Stage, a First Stage kit includes a microwave transparent cover, a microwave transparent thermal insulating support and the browning/crusting device. In the Second Stage, only the browning/crusting device is used to complete the overall process. The browning/crusting device is pre-heated in a microwave oven to achieve an elevated browning/crusting temperature before applying food to the browning/crusting device.

13 Claims, 3 Drawing Sheets

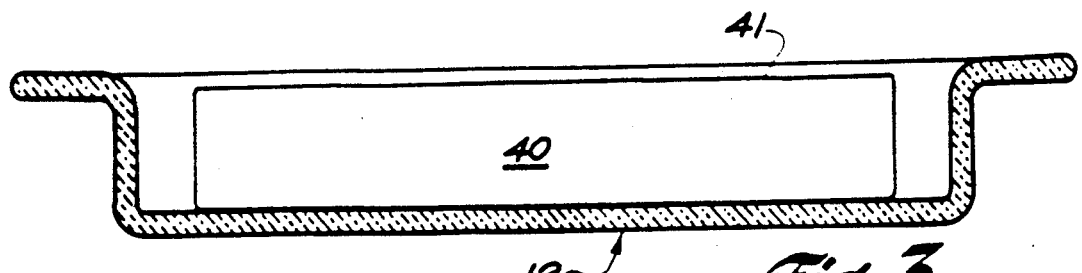
Fig. 3
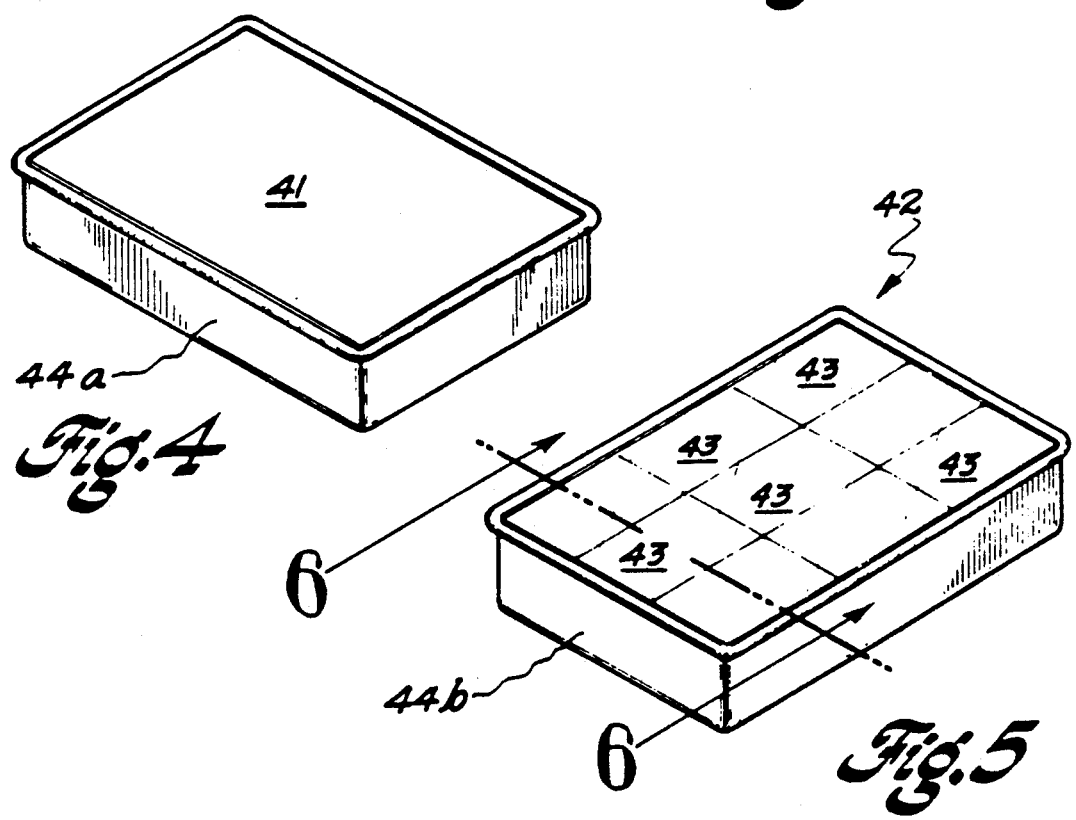
Fig. 4
Fig. 5
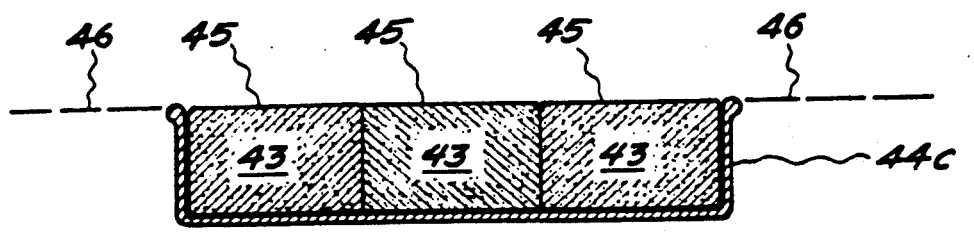
Fig. 6

5,094,865

TWO STAGE PROCESS FOR COOKING/BROWING/CRUSTING FOOD BY MICROWAVE ENERGY AND INFRARED ENERGY

BACKGROUND OF THE INVENTION

1. Field of the Invention

This invention concerns a two-stage method for cooking/browning/crusting food: first, a microwave energy stage; and second, an infrared energy stage. The invention further includes preferred browning/crusting devices to support and contact food during each stage.

2. Description of Prior Art

This invention improves over and increases the utility of the microwave browning grill of U.S. Pat. No. 4,906,806, and U.S. Pat. No. 4,923,704.

U.S. patent application Ser. Nos. 286,234, filed Jan. 13, 1989 and U.S. Ser. No. 645,790, filed Jan. 25, 1991 improve over and increase the utility of the microwave shielded chamber of U.S. Pat. No. 4,906,806. These copending applications disclose how the cooking results of food, cooked in a microwave oven, may be enhanced by a subsequent exposure to infrared energy in a conventional thermal oven. These copending applications primarily concern foods which, during cooking, produce liquid by-products, e.g., sausages, whole chicken, and the like. In contrast, this invention primarily concerns foods which, during cooking, produce little or no liquid by-products, e.g., bread and cake. For any particular food, the results desired by the cook, dictate which apparatus and which cooking method to use.

U.S. Pat. Nos. 3,701,872 and 3,777,099 describe preheating metal plates in a microwave oven by means of a microwave-absorptive heating member. U.S. Pat. Nos. 3,731,037 and 3,881,027 disclose a microwave oven apparatus, with heating layers on the ceiling, floor and walls of the microwave chamber, and describe cooking food in a metal container in that microwave chamber. U.S. Pat. No. 4,306,133 describes microwave cooking a fruit pie having a double crust. U.S. Pat. No. 3,914,967 describes microwave heating grill constructions.

The prime advantage of microwave cooking over conventional cooking, is the ability of microwave energy to surround a food and to penetrate and release energy below the surface of a food. Microwave energy, in a 700 watt microwave oven, surrounds and heats the mass of a food. In contrast, infrared energy, from a 700 watt infrared broiler heating element will heat only the exposed surface, in direct line-of-sight, of a food thereunder.

When one desires to sear, crust, broil and brown large portions of food, the full power, domestic microwave oven delivers typically only 700 watts. In comparison, a conventional gas or electric kitchen range broiler can deliver about 7000 watts. It follows that foods with large surfaces and heavy portions of food will brown and crust better under an infrared, conventional broiler with its greater heating capability.

It is an object of this invention to provide improved ways to combine microwave oven cooking with cooking under the broiler of a conventional gas or electric kitchen range.

It is another object of this invention to provide improved ways to broil, crust, fry, sear, and toast by combining sequential microwave energy and infrared energy cooking.

It is another object of this invention to provide new methods for combining sequential microwave energy and infrared energy cooking of foods such as baking pizza pies; cooking hot dogs and toasting hot dog rolls; baking two-crust meat pies and fruit pies; reheating Chinese noodles; baking cakes, cookies, rolls, fruit turnovers, biscuits, breads; and heating frozen convenience foods such as hors d'oeuvres, fried chicken and French-fried potatoes.

STATEMENT OF THE PRESENT INVENTION

According to the present invention, a novel browning/crusting device has dual utility in cooking/browning/crusting when exposed to either microwave energy or infrared energy. There are ovens available which include both a microwave generator and an infrared broiler in their heating chambers for alternate use. The methods of this invention may be practiced in such combined ovens.

According to this invention, certain foods are cooked/browned/crusted in two stages on a novel browning/crusting device. The First Stage is carried out in a microwave chamber on the preheated browning/crusting device. The Second Stage is carried out on the same browning/crusting device beneath an infrared broiler. The browning/crusting is a microwave-lossy unit that can develop temperatures in the 350°–650° F. range when exposed to microwave energy in a microwave chamber.

In the First Stage, microwave cooking/browning/crusting is carried out. A moisture confining, microwave transparent cover encloses the browning/crusting device to define a cooking chamber. The food to be cooked/browned/crusted is placed in the cooking chamber on a preheated browning/crusting device. Any splatter and moisture from the food, is confined within the cooking chamber during the First Stage. The First Stage ends when the food in contact with a cooking surface of the browning/crusting device has been browned/crusted as desired. At the end of the First Stage of the method, the browning/crusting device, without the cover, is placed beneath an infrared broiler and the top surfaces of the food are browned/crusted. The browning/crusting device may be designed to be useful as a heated, insulated service platter and/or hot plate.

In a preferred embodiment, the browning/crusting device comprises a metal plate having an exposed metal cooking surface, which functions as a browning/crusting surface, and having another metal surface which is coated with a microwave-lossy composition which is in a heat transferring relationship with the metal plate. In a further preferred embodiment, the cooking surface is concave and the thickness of the microwave-lossy composition is greater at the perimeter of the metal plate than at the center of the metal plate. In an alternative embodiment, the browning/crusting device is a block (or multiple blocks in an array) of microwave-lossy ceramic or microwave-lossy igneous rock. The block or blocks are retained in a metal tray.

The browning/crusting device is supported on a microwave-transparent, heat-insulating member such as a non-lossy ceramic shallow bowl, tray or frame. Preferably, the cover is a heat-resistant, non-lossy glass bowl having a rim engaged with the perimeter of the heat-insulating container.

DESCRIPTION OF THE DRAWINGS

FIG. 3 is a cross-section illustration of an alternative browning/crusting device on a heat-insulating tray, for practicing the Second Stage of the invention.

FIG. 4 is a perspective illustration of a ceramic or igneous rock cooking block within a metal tray which blocks microwave energy from entering the sides and base of the rock.

FIG. 5 is a perspective illustration of plural ceramic or igneous rock blocks, assembled in an array within a metal tray, to function as an alternative embodiment of a browning/crusting device.

FIG. 6 is a cross-section of the browning/crusting device of FIG. 5 taken along the plane 6-6.

DESCRIPTION OF THE PREFERRED EMBODIMENTS

Figure 1:
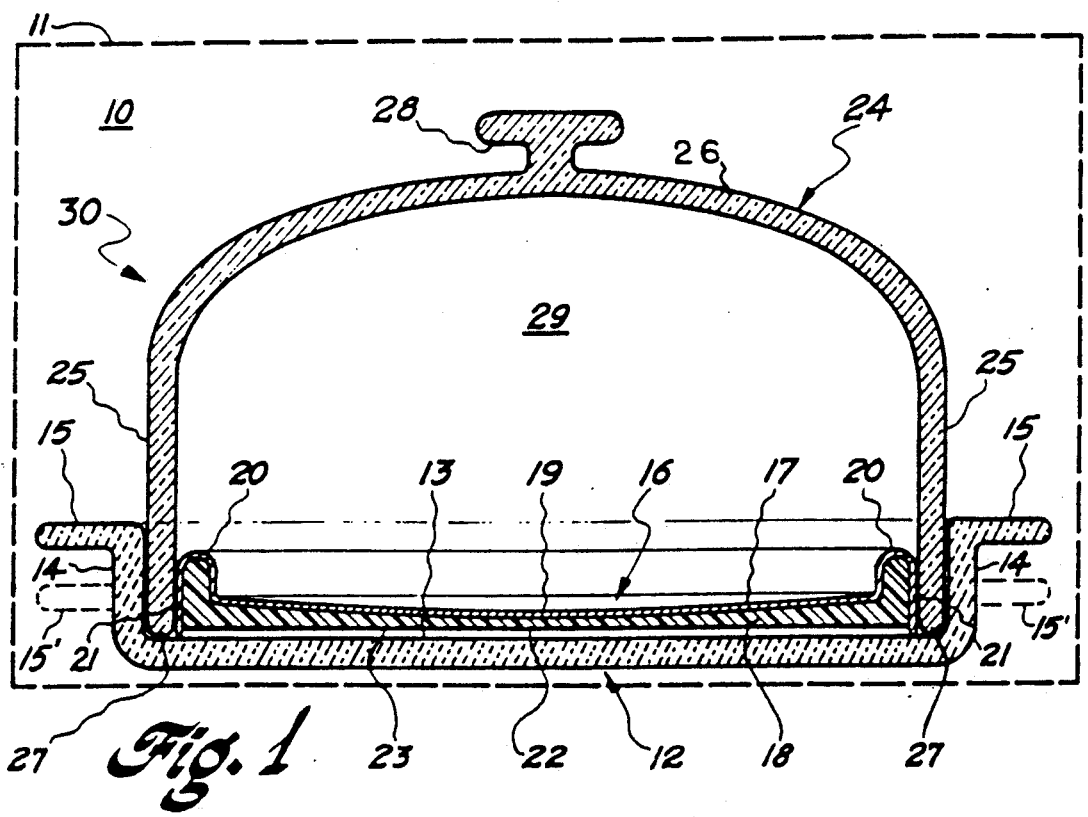
FIG. 1 is a cross-section view of a microwave oven chamber containing an insulator member, a browning/crusting device, and a cover for practicing the First Stage of the invention.

FIG. 1 illustrates a microwave oven chamber 10 defined by a broken line 11. Positioned within the microwave chamber 10 is a heat-insulating member 12 having a generally horizontal base 13 upstanding sidewalls 14 and handles 15. The sidewalls 14 may be shortened and handles 15 (shown in phantom) may be provided whereby the heat-insulating member 12 has a lower height. Side walls 14 are not required, but are convenient for supporting other elements. Preferably, the heat-insulating member 12 is fabricated from microwave-transparent, heat-resistant, non-lossy glass-ceramics which will not degrade under a gas flame of a gas broiler heating unit.

A browning/crusting device 16, in a preferred embodiment, includes a metal plate 17 and a microwave-lossy composition 18 adhered to the under-surface of the metal plate 17. The metal plate 17 has a concave surface 19 and an upstanding perimeter bead 20 and a depending sidewall 21. It will be observed that the concave surface 19 presents a convex surface 22 on the opposite side of the metal plate 17. The sidewall 21 has sufficient height to position a microwave-lossy composition 18 above the base 13 of the insulating support 12. The metal plate 17 preferably is formed from aluminum having a thickness of approximately 1/16 inch to 3/8 inch. Other heat-conductive metals may be employed, such as stainless steel and carbon steel. The microwave-lossy composition 18, preferably, is a high temperature curable binder (e.g., a poly epoxide) having dispersed therein particles of microwave-lossy materials, such as ferrite, that become heated when exposed to microwave energy.

Figure 9:
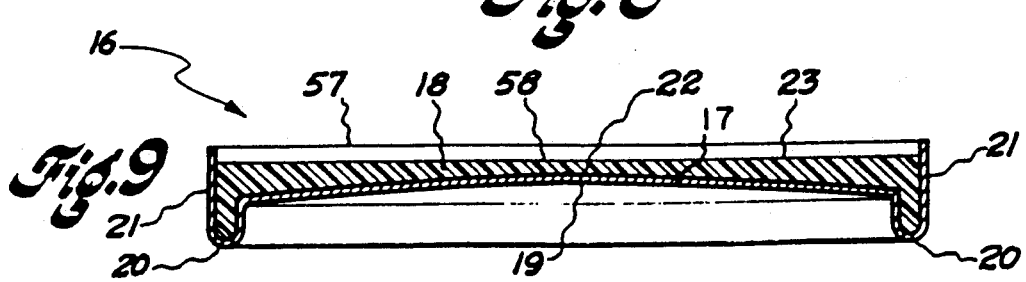
FIG. 9 is a cross-section illustration of a preferred browning/crusting device in an inverted position.

FIG. 9 illustrates an inverted browning/crusting device 16. Microwave-lossy composition 18 was poured into inverted grill plate 17 as a liquid, uncured composition of ferrite and a plastic binder. The convex surface 22 of the metal plate 17, and the level top surface 23 of the microwave-lossy composition 18, shape the microwave lossy composition 18 relatively thin at the center and relatively thick at the perimeter. In addition, a perimeter groove formed by the under-surface of the bead 20, is filled with lossy composition 18. As a result of the browning/crusting device 16 having a larger concentration of microwave-lossy composition at the perimeter, the larger concentration heats the food contacting surface 19 more evenly than a uniform thickness of microwave lossy composition.

In FIG. 1, a cover 24 has generally cylindrical sidewalls 25, a top 26 and a rim 27. One or more handles 28 are provided to facilitate lifting the cover 24 and to serve as a support for cover 24 when it is disposed in its rim-up condition as a bowl. The cover 24 preferably is formed from heat-resistant, non-lossy glass which is microwave transparent and light transparent.

The rim 27, of cover 24, mates with heat-insulating support 12 to produce an enclosed cooking chamber 29. The browning/crusting device 16 is confined within chamber 29. Moisture released, while heating food on browning/crusting device 16, is confined within the chamber 29. The confined moisture will condense on the relatively cool surface of the cover 24 and will be retained within the chamber 29.

OPERATION

First Stage

The elements 30, illustrated in FIG. 1, in microwave oven chamber 10, are exposed to microwave energy. The heat-insulating support 12 and cover 24 are microwave transparent and are not heated by microwave energy. The microwave-reflective metal plate 17 is not heated by microwave energy. The microwave-lossy composition 18 becomes heated by the microwave energy. Thermal energy, from the heated microwave-lossy composition 18, is transferred to the metal plate 17 and the temperature of the metal plate 17 increases. Browning/crusting device 16 is preheated empty until it reaches a browning/crusting temperature, e.g. 350°-650° F.

Browning/crusting device 16, exposed to microwave energy, within the heat-confining chamber 29, is free to rise to browning temperatures far in excess of temperatures realized in prior art metal heating grills for microwave oven use. For example, the browning utensil of U.S. Pat. No. 4,496,815 has a metal, browning element whose maximum temperature is limited by the deformation temperature of its plastic support.

After the browning/crusting device 16 is preheated, the microwave chamber 10 is opened; the assembled First Stage elements 30 (cover 24, heat-insulating support 12 and browning/crusting device 16) are removed from the microwave chamber 10. The cover 24 is lifted, and an appropriate food, to be cooked/browned/crusted, is placed on the hot, metal cooking surface 19. The cover 24 is returned. The reassembled First Stage elements 30, with the food, are placed into the microwave chamber 10 and exposed to additional microwave energy. The surfaces of the food, which contacts the hot food-contacting surface 19, of the browning/crusting device 16, are thermally browned/crusted as desired while the remainder of the food is cooked by microwave energy which passes through the microwave transparent cover 24 and penetrates the food.

OPERATION

Second Stage

Figure 2:
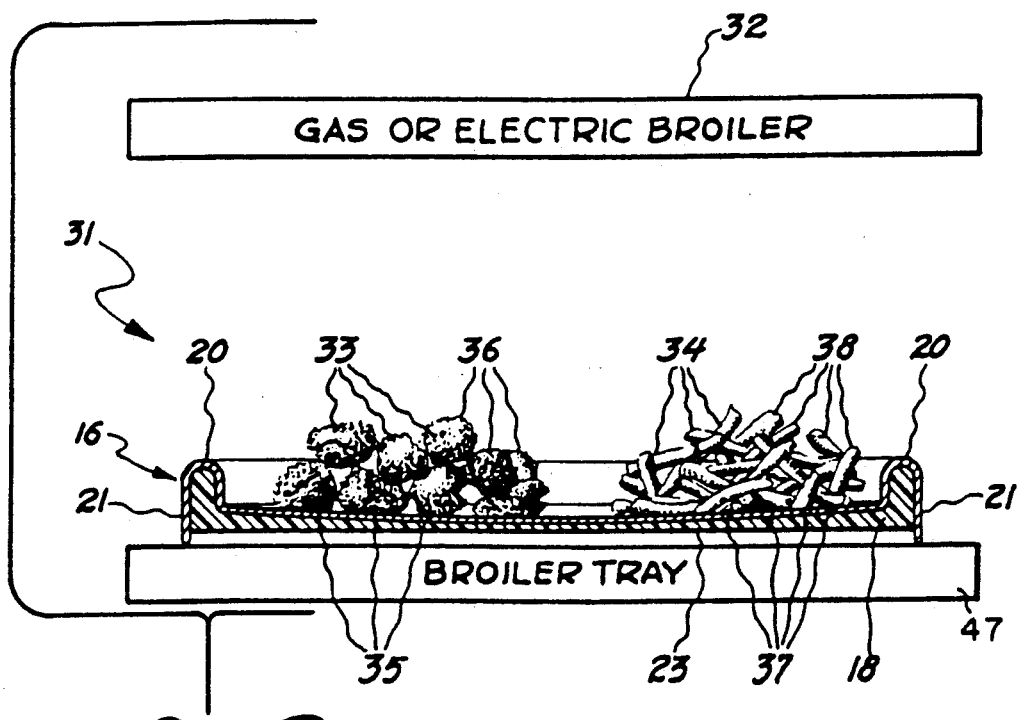
FIG. 2 is a cross-section illustration of the browning/crusting device, of FIG. 1, on a broiler tray positioned beneath an infrared broiler for practicing the Second Stage of the invention.

After being exposed to microwave energy, the assembled First Stage elements 30 (the cover 24, heat-insulating support 12 and browning/crusting device 16), with the food thereon, are removed from microwave chamber 10. The cover 24 is removed exposing the food on the food contacting surface 19. The Second Stage is commenced by removing the browning/crusting device 16, from the heat-insulating support 12, and placing it, with the food thereon, beneath an infrared broiler 32, on broiler tray or rack 47, as shown in FIG. 2. The infrared broiler 32 may be an electrical resistance thermal energy generator, such as a resistance wire, nichrome bars or other well-known heating elements. Alternatively, the infrared broiler 32 may be a combustible gas burner which is well-known in the broiling art.

In the First Stage of this process, prepared, frozen, fried, breaded chicken 33 and frozen, pre-cooked French-fried potatoes 34 were defrosted/heated and their bottom surfaces 37,37, contacting the food contacting surface 19, were browned/crusted as desired. In the Second Stage, both the food and the browning/crusting device 16, are heated by infrared energy radiating from an infrared broiler 32. The upper surfaces 36,38, of the breaded chicken 33, French-fried potatoes 34, and the exposed surfaces of the browning/crusting device 16 are heated.

PRIOR ART

In the prior art, multiple pieces of food had to be, individually turned over to brown both sides. In the prior art, glass-ceramic, browning platters with a layer of microwave-lossy tin oxide were available for browning foods in a microwave chamber.

According to the present invention during the First Stage, the under-surface of the food is browned/crusted by direct conduction of heat in a microwave chamber; the Second Stage of browning/crusting is carried out on the upper surface of the food with infrared energy from an infrared broiler. Beneath the broiler, the browned under-surface is maintained hot by heat released from browning/crusting device. Spot heating and selective heating and selective defrosting, of a food, that occurs, during the First Stage, equalizes, during the Second Stage, in which the food "rests" and completes cooking.

ALTERNATIVE EMBODIMENT

As shown in FIG. 3, the browning/crusting device 40 may comprise a microwave safe block 40 (square, rectangular, circular, oval, et cetera) of microwave-lossy ceramic or a microwave-lossy, igneous rock. Igneous rock blocks have been sold in the United States under the trade name LAVA ROCK. Rock and ceramic which includes air or water pockets are not recommended because they might explode when exposed to microwave energy.

At least one of the exposed flat surfaces 41, of block 40, has a smooth surface and can function as a cooking surface for browning/crusting foods. The block 40, when exposed to microwave energy, becomes uniformly heated. The block 40 preferably is preheated to a browning/crusting temperature within the range of 450°–650° F. and food is cooked on the smooth surface 41 in a First microwave Stage and a Second infrared Stage.

The block 40 is preferably placed in a metal tray 44a as seen in FIG. 5. Only the exposed surface 41 of the block 40 is seen in FIG. 5. The metal tray 44a preferably has sidewalls which terminate with the surface 41. The metal tray 44a blocks microwave energy from the sides and bottom, whereby microwave energy can penetrate the block solely through the exposed surface 41.

A further alternative embodiment of the invention is an array 42 of individual small blocks 43 of microwave lossy ceramic or igneous rock as shown in FIGS. 5, 6. The blocks 43 are assembled into a desired geometric shape (a rectangle is shown in FIG. 5). A metal tray 44b is provided to retain the blocks 43 in the desired array and to prevent microwave energy from penetrating the blocks 43 except through the exposed surfaces 45. One of the smooth surfaces 45 of each of the blocks 43 is maintained in a common plane 46 as shown in FIG. 6. Those co-planar surfaces 45 function as a food contacting surface of the browning/crusting device 40 of FIG. 3. The tray 44b acts as a microwave shield which also equalizes heat across the bottom of the rock and concentrates exposure to microwave energy on the top center of the food cooking surface. The tray 44b speeds the heating to browning/crusting temperatures of surfaces 41 and 45 by preventing microwave energy from reaching the bottom of blocks 40, 43.

A five pound block 40 may be heated for 30 minutes or more. It takes longer to heat heavy block 40 than to heat a metal device 16, but, once heated, five pound block 40 remains hotter longer than device 16 when functioning as a hot, post-cooking serving plate. The heated blocks 43 can function as hot, post-cooking "hot cubes" to maintain heat of cooked foods.

In FIG. 3, the block 40 is shown directly on the insulated tray 12. This embodiment, without a metal tray, may be employed in the First Stage and/or in the Second Stage. A metal tray 44a as shown in FIG. 5 is preferred, although not shown in FIG. 3.

Figure 7:
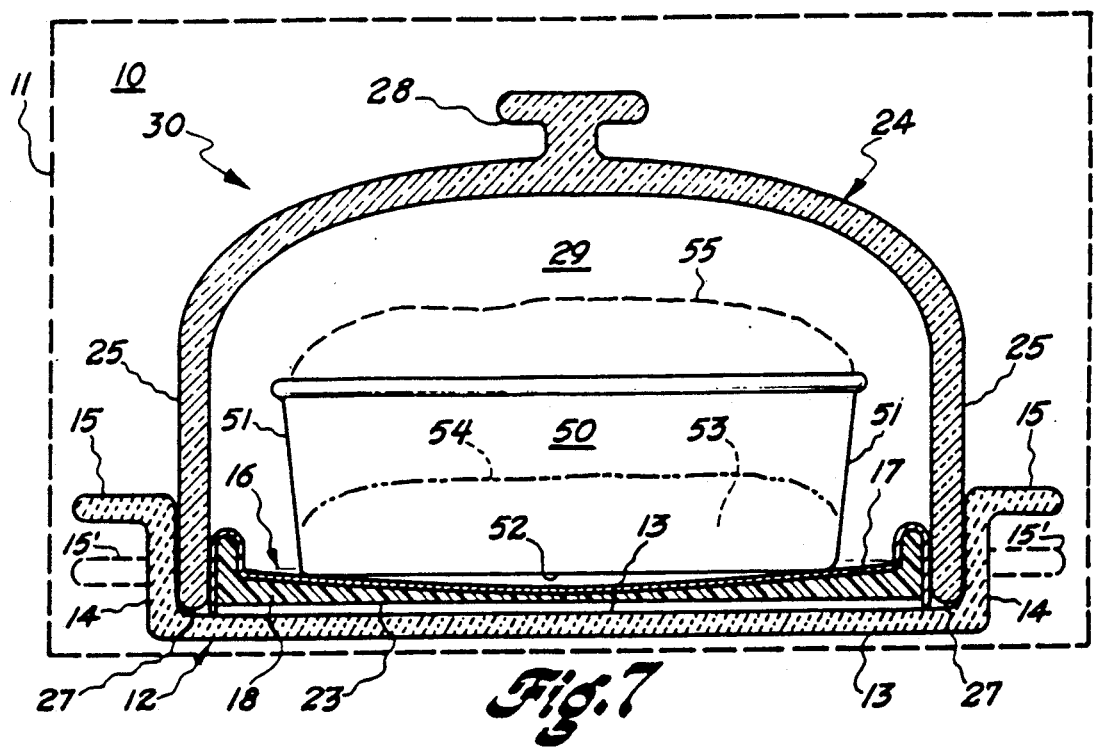
FIG. 7 is a cross-section illustration, similar to FIG. 1, showing a heat-insulating support member, a browning/crusting device, a cover member, and a bread or cake pan for practicing the First Stage or the invention for baking/browning/crusting bread or cake.
Figure 8:
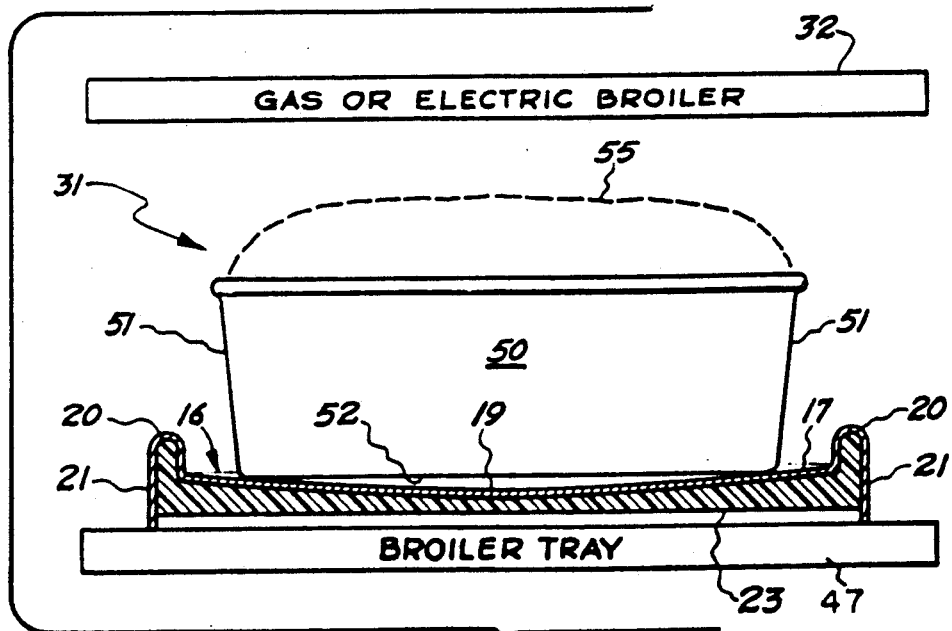
FIG. 8 is a cross-section illustration of selected elements, of FIG. 7, including the browning/crusting device, positioned on a broiler tray, and the bread or cake pan positioned beneath an infrared broiler for practicing the Second Stage of the invention.

In FIG. 7, a First Stage assembly 30 similar to that of FIG. 1 is illustrated in a microwave chamber 10. In FIG. 8 a Second Stage assembly 31 similar to that of FIG. 2 is illustrated. In FIG. 8, the browning/crusting device 16 is positioned on a conventional kitchen range broiler tray or rack 47, beneath an infrared broiler 32.

As shown in FIG. 7, a cake/bread pan 50 has upward sidewalls 51 and a generally flat base 52. The base 52 is usually rectangular although other geometric shapes such as circles, ovals and the like are known. In order to bake bread/cake, the browning/crusting device 16 is preheated in a microwave chamber 10 to a desired browning/crusting temperature, in the range 450°–550° F. The preheating can be carried out by placing the browning/crusting device 16 on the heat-insulating support member 12 during the preheating of the browning/crusting device 16.

Thereafter a metal, bread/cake pan 50 containing bread dough 53 (or cake batter) having an initial upper surface shown by the broken line 54, is placed on top of the food contacting surface 19 of the browning/crusting device 16. The cake/bread pan 50 will be in heat transfer relationship with the food contacting surface 19 and will receive thermal energy from the hot food contacting surface 19 by conduction and convection. The assembly 30, as shown in FIG. 7 (including the cover 24) is returned to the microwave chamber 10 with the bread/cake pan 50. During the First Stage of the browning/crusting process (FIG. 7), microwave energy passes through the microwave transparent cover 24 and directly into the bread/cake dough 53 causing the dough to become heated, to rise and to bake. The resulting cake/bread rises to a level indicated by the numeral 55. Meantime the cake pan 50 has become heated by the high temperature of the browning/crusting device 16 with the result that the bottom of the bread/cake that is in contact with the heated cake pan is browned/crusted. This ends the First Stage. The First Stage assembly 30 of FIG. 7 is removed from the microwave chamber 10.

In the Second Stage, FIG, 8, browning/crusting device 16 with the bread/cake pan 50 containing microwave baked bread/cake at the level 55, is placed beneath an infrared broiler 32 whereby the top surface 55 of the bread/cake is browned/crusted as desired by exposure to infrared energy. During the Second Stage browning/crusting of top surface 55, infrared energy from the broiler 32 also heats the exposed, metal surface 19 of the browning/crusting device 16. The infrared broiler 32 keeps device 16 at an elevated temperature, throughout the Second Stage.

The broiler element 32 may be heated during the First Stage of the process so that the broiler 32 is at its operating conditions when the Second Stage commences. This sequence abbreviates the overall duration of the browning/crusting process.

ALTERNATE EMBODIMENT

It is preferred not to heat the heat-insulating support member 12 beneath broiler 32, during the Second State. Instead the heat-insulating member 12 may cool during the Second Stage. After the Second Stage, a relatively cool serving base heat-insulating member 12 may receive the high-temperature, browning/crusting device 16. The cool, heat-insulating member 12 thus has added utility. It accepts the hot, browning/crusting device 16, out from under the infrared broiler, and combines with device 16 to become a "sizzling skillet" food serving device. An alternate embodiment is to place insulating member 12 under broiler 32 with device 16 during the Second Stage.

While the present two-stage cooking method has been employed successfully cooking/browning/crusting fried chicken and French fried potatoes, the method may also be employed to brown/crust pizza pies; to brown hot dogs and toast hot dog rolls; to bake two-crust meat pies and fruit pies; to reheat Chinese noodles; to bake cakes, cookies, rolls, fruit turnovers, biscuits, breads; to defrost and heat frozen convenience foods such as hors d'oeuvres, fried chicken and French-fried potatoes.

I claim:

1. A method for browning/crusting food, in two stages, comprising:
   in a first stage: placing a microwave-lossy browning/crusting device in a microwave chamber, said browning/crusting device including a food contacting surface on a non-metal, thermal insulating tray supporting said browning/crusting device; said browning/crusting device further being resistant to heat damage when exposed to infrared energy from an infrared broiler; said browning/crusting device being at least in part microwave-lossy; exposing said browning/crusting device to microwaves until said food contacting surface is heated to a food browning/crusting temperature; placing said food to be browned/crusted on said food contacting surface to brown/crust said food in contact with said food contacting surface; and
   in a second stage: exposing said browning/crusting device and said food to infrared energy by placing said browning/crusting device, with said food on said food contacting surface, beneath an infrared broiler whereby a surface of said food, opposed to said food contacting surface, is browned/crusted by said infrared energy from said broiler.

2. The method of claim 1 wherein said browning/crusting device retains an elevated temperature, above room temperature, subsequent to said second stage, and functions as a heated serving platter for said food.

3. The method of claim 1 wherein said infrared broiler is in said microwave chamber.

4. The method of claim 1 wherein said browning/crusting device includes a metal plate which has a metal food contacting surface and has a microwave-lossy composition in contact with the opposite surface of said metal plate.

5. The method of claim 1 wherein said browning/crusting device comprises a microwave-lossy member, formed from microwave-lossy ceramic or from microwave-lossy igneous rock, said member having at least one smooth surface which is the said food contacting surface; said member being supported on a metal tray which shields the bottom and side walls of said member from microwave energy.

6. The method of claim 5 wherein said microwave-lossy member comprises multiple blocks of microwave-lossy ceramic or igneous rock, said blocks being assembled in an array with one flat surface of each block lying in a common plane which is said food contacting surface.

7. The method of claim 1 wherein said food is cooked by exposure to microwave energy, in said microwave chamber, on said browning/crusting device subsequent to said first stage browning/crusting and prior said second stage browning/crusting.

8. The method of claim 1 wherein said infrared broiler is preheated while said food is browning/crusting on said food contacting surface within said microwave chamber during said first stage.

9. The method of claim 1 wherein said food is browned/crusted in a metal pan having a bottom surface that contacts the food contacting surface of the browning/crusting device.

10. The method of claim 9 wherein said food is bread and, during said first stage, bread dough is baked in said metal pan having a bottom surface in contact with said food contacting surface and, during said second stage, said baked bread is browned/crusted in said metal pan beneath said infrared broiler.

11. The method of claim 9 wherein said food is cake and, during said first stage, a cake batter is baked in said metal pan having a bottom surface in contact with said food contacting surface and, during said second stage, said baked cake is browned/crusted in said metal pan beneath said infrared broiler.

12. In the method of claim 4 wherein the said metal plate has a concave surface which comprises said food contacting surface, positioning said food centrally on said concave surface.

13. A method for browning/crusting food, in two states, comprising:

in a first stage: placing a microwave-lossy browning/crusting device in a microwave chamber, said browning/crusting device including a metal plate having a metal food contacting surface and a microwave-lossy non-metallic mass engaged with said metal plate on its opposite surface; placing said browning/crusting device on a non-metal, thermal insulating tray supporting said browning/crusting device; said browning/crusting device further being resistant to heat damage when exposed to infrared energy from an infrared broiler; exposing said browning/crusting device to microwave until said food contacting surface is heated to a food browning/crusting temperature; placing said food to be browned/crusted on said food contacting surface to brown/crust said food in contact with said food contacting surface; and in a second stage: exposing said browning/crusting device and said food to infrared energy by placing said browning/crusting device, with said food on said metal food contacting surface, beneath an infrared broiler whereby a surface of said food, opposed to said metal food contacting surface, is browned/crusted by said infrared energy from said broiler.

* * * * *

US005094865C1

(12) REEXAMINATION CERTIFICATE (4324th)

United States Patent
Levinson

(10) Number: US 5,094,865 C1
(45) Certificate Issued: May 1, 2001

(54) TWO STAGE PROCESS FOR COOKING/ BROWNING/CRUSTING FOOD BY MICROWAVE ENERGY AND INFRARED ENERGY

(75) Inventor: Melvin L. Levinson, 8 Stratford Cir., Edison, NJ (US) 08820-1830

(73) Assignee: Melvin L. Levinson, Edison, NJ (US)

Reexamination Request:
No. 90/005,124, Oct. 9, 1998

Reexamination Certificate for:
Patent No.: 5,094,865
Issued: Mar. 10, 1992
Appl. No.: 07/659,340
Filed: Apr. 15, 1991

(22) PCT Filed: Feb. 18, 1991
(86) PCT No.: PCT/US91/01042
§ 371 Date: Apr. 15, 1991
§ 102(e) Date: Apr. 15, 1991

(51) Int. Cl.[7] .................................. A23L 1/00; H05B 6/00
(52) U.S. Cl. .................... 426/243; 219/685; 219/730; 219/732; 426/107; 426/234
(58) Field of Search ................... 426/107, 113, 426/234, 243; 219/678, 730

(56) References Cited

U.S. PATENT DOCUMENTS

| | | |
|---|---|---|
| 3,731,037 | 5/1973 | Levinson . |
| 3,881,027 | 4/1975 | Levinson . |
| 3,941,967 | 3/1976 | Sumi . |
| 4,188,520 | 2/1980 | Dills . |
| 4,266,108 | 5/1981 | Anderson . |
| 4,306,133 * | 12/1981 | Levinson .............................. 426/243 |
| 4,318,931 | 3/1982 | Schiffmann . |
| 4,396,635 * | 8/1983 | Roudebush et al. .................. 426/243 |
| 4,454,403 | 6/1984 | Teich . |
| 4,481,394 | 11/1984 | Tanabe . |
| 4,496,815 | 1/1985 | Jorgensen . |
| 4,542,271 | 9/1985 | Tanonis . |
| 4,701,585 | 10/1987 | Stewart . |
| 4,771,154 | 9/1988 | Bell . |
| 4,822,966 * | 4/1989 | Matsubara .............................. 219/730 |
| 5,268,546 * | 12/1993 | Berg ...................................... 426/243 |

FOREIGN PATENT DOCUMENTS

| | | |
|---|---|---|
| 1049019 | 1/1954 | (DE) . |
| 2152790 | 8/1985 | (GB) . |
| 2196231 | 4/1988 | (GB) . |

OTHER PUBLICATIONS

Whirlpool; Whirlpool Brochure; Published 1983.
Richard Deacon; Richard Deacon's Microwave Cookery; Published 1977.
Corning; Corning Microwave Plus; Published 1986.
Single Sizzle; Single Sizzle; Published 1986.
Levinson Deposition; Patentee Deposition.
Fandre; Microwaves Are For Cooking; Published 1983.
Spector; The New Wave In Cooking; Published 1980.

(List continued on next page.)

Primary Examiner—George C. Yeung

(57) ABSTRACT

A two-stage process for baking/crusting food products is proposed. The First Stage is carried out in a microwave oven chamber; the Second Stage is carried out beneath a gas or electric broiler. In both stages, the food is placed on a browning/crusting device which provides a metal cooking surface, heated by adherent microwave lossy materials or on a smooth surface of one or more blocks of microwave lossy ceramic or microwave lossy igneous rock which is supported in a metal tray. In the First Stage, a First Stage kit includes a microwave transparent cover, a microwave transparent thermal insulating support and the browning/crusting device. In the Second Stage, only the browning/crusting device is used to complete the overall process. The browning/crusting device is pre-heated in a microwave oven to achieve an elevated browning/crusting temperature before applying food to the browning/crusting device.

OTHER PUBLICATIONS

Benoit; Madam Benoit's Microwave Cookbook; Published 1975.
Drew & Rhee; Microwave Cookery of Beef Patties; Browning Methods; Published Jun., 1979.
Baird; Timer Systems For Cooking Apparatus, or the Like; Published Apr. 3, 1962.
Tanaka; Microwave Oven Equipped With Electric Heating Element; Published Mar. 4, 1980.
Warner; High Frequency Oven; Published Mar. 12, 1963.
Freedman, Ferrite Heating Apparatus; Published Dec. 7, 1982.
Bowen; Microwave Pizza Maker; Published May 22, 1984.
Corning Brochure, "Corning Micromatic Browner", glass–ceramic dish instructions—6 pages (publication date unknown).*
Northland Brochure, Northland Aluminum Products Inc., product instructions—2 pages (publication date unknown).*
Rubbermaid's "Browning Grill Use & Care Instruction"—2 pages, published 1987.*
Regal Ware, Inc. "Microwave Cookware" instructions—2 pages (publication date unknown).*
Regal Ware, Inc. "Microwave Cookware" label—1 page (publication date unknown).*
Raytheon "Micro 21 Pizza Oven" instructions—2 pages, published 1981.*
General Electric Microwave/Convection Combination Cookbook—6 pages, published 1983.*
Farberware/Kidde, Tracing of browning pan caution—1 page (publication date unknown).*

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2–12, dependent on an amended claim, are determined to be patentable.

New claims 14–29 are added and determined to be patentable.

1. A method for browning/crusting food, in two stages, comprising:
   in a first stage: placing a microwave-lossy browning/crusting device in a microwave chamber, *where* said browning/crusting device [including] *includes* a food contacting surface *and a microwave-absorptive material; placing said browning/crusting device* on a non-metal, thermal insulating tray supporting said browning/crusting device; said browning/crusting device further being resistant to heat damage when exposed to infrared energy from [an] *a conventional* infrared boiler[; said browning/crusting device being at least in part microwave-lossy]; exposing said browning/crusting device to [microwaves] *microwave energy* until said food contacting surface is heated to a food browning/crusting temperature; placing said food to be browned/crusted on said food contacting surface to brown/crust said food in contact with said *heated* food contacting surface; and
   in a second stage; exposing said browning/crusting device and said food to infrared energy by placing said browning/crusting device, with said food on said food contacting surface, beneath [an] *a conventional* infrared broiler [whereby a] *until the* surface of said food, opposed to said food contacting surface, is browned/crusted by said infrared energy from *said conventional* broiler.

13. A method for browning/crusting food, in two stages, comprising:
    in a first stage: placing a microwave-lossy browning/crusting device in a microwave chamber, said browning/crusting device including a metal plate having a metal food contacting surface and a microwave-lossy non-metallic mass engaged with said metal plate on its opposite surface; placing said browning/crusting device on a non-metal, thermal insulating tray supporting said browning/crusting device; said browning/crusting device further being resistant to heat damage when exposed to infrared energy from [an] *a conventional* infrared broiler; exposing said browning/crusting device to microwave until said food contacting surface is heated to a food browning/crusting temperature; placing said food to be browned/crusted on said food contacting surface to brown/crust said food in contact with said food contacting surface; and
    in a second stage: exposing said browning/crusting device and said food to infrared energy by placing said browning/crusting device, with said food on said metal food contacting surface, beneath [an] *a conventional* infrared broiler whereby a surface of said food, opposed to said metal food contacting surface, is browned/crusted by said infrared energy from said *conventional* broiler.

14. *A method for browning and crusting food, in two stages, comprising:*
    *in a first stage: preheating, in a microwave oven, a metal, microwave-lossy, browning pan that is placed on a non-metal, microwave-non-lossy, thermal-insulating tray, to at least the browning temperature of said food,*
    *where said metal, microwave-lossy, browning pan includes a food contacting surface on one side of said browning pan and a microwave-absorptive material on the other side of said browning pan,*
    *where said microwave-lossy browning pan is resistant to heat damage when exposed to infrared energy from a conventional gas or electric broiler,*
    *placing said food to be browned and crusted on said preheated food contacting surface to brown and crust said food in contact with said preheated food contacting surface,*
    *exposing said food to microwave energy, and then*
    *in a second stage: exposing to infrared energy, radiating from a conventional, gas or electric broiler located in said microwave oven's heating chamber, said microwave browning pan with said food thereon, whereby a surface of said food, not in contact with said food contacting surface, is browned and crusted by exposure to said infrared energy radiating from said conventional, gas or electric broiler.*

15. *The method of claim 14 that includes, subsequent to said second stage, employing said heated browning pan and said non-metal, microwave-non-lossy, thermal-insulating tray as a heat-maintaining, serving platter for said food.*

16. *The method of claim 14 wherein said conventional broiler is exterior said microwave chamber.*

17. *The method of claim 16 wherein, in said second stage, removing from said microwave oven said preheated browning pan and exposing said preheated browning pan with said food thereon to infrared energy emanating from said conventional broiler that is not in said microwave chamber.*

18. *The method of claim 16 preheating said external conventional broiler while said food is exposed to microwave energy in said microwave chamber.*

19. *The method of claim 1 that includes exposing said food to microwave energy prior said second stage.*

20. *The method of claim 14, during said first stage, covering said food with a transparent, microwave-non-lossy cover.*

21. *The method of claim 14 whrein said metal browning pan is preheated to between 450° and 550° F.*

22. *The method of claim 14 wherein said food is a pizza pie.*

23. *In the method of claim 14, wherein said food contacting surface has a concave surface, centering said food on said concave surface.*

24. *The method of claim 14 that includes placing said food to be browned and crusted in a separate metal pan having a bottom surface that contacts the food contacting surface of said metal browning pan.*

25. *The method of claim 24 before placing said separate metal pan thereon, preheating said metal browning pan to between 350° and 650° F.*

26. The method of claim 24 wherein said separate metal pan is selected from the group consisting of pie pans, cake pans and bread pans.

27. The method of claim 26 wherein said food is bread and, during said first stage, a bread dough is exposed to microwave energy in said separate metal bread pan and, during said second stage, exposing the top crust of said bread in said separate metal bread pan to said infrared energy radiating from said conventional, gas or electric broiler.

28. The method of claim 26 wherein said food is cake and, during said first stage, a cake batter is exposed to microwave energy in said separate metal cake pan and, during said second stage, exposing the top layer of said cake in said separate metal cake pan to said infrared energy radiating from said conventional, gas or electric broiler.

29. The method of claim 26 wherein said food is a two crust pie and, during said first stage, an unbaked two crust pie is exposed to microwave energy in said separate metal pie pan and, during said second stage, exposing the top crust of said two crust pie in said metal pie pan to said infrared energy from said conventional, gas or electric broiler.

* * * * *